(12) United States Patent
Howard

(10) Patent No.: US 12,083,869 B2
(45) Date of Patent: Sep. 10, 2024

(54) ADJUSTABLE WINDOW

(71) Applicant: Optic Armor, LLC, Linn Creek, MO (US)

(72) Inventor: James Howard, Linn Creek, MO (US)

(73) Assignee: Optic Armor, LLC, Linn Creek, MO (US)

( * ) Notice: Subject to any disclaimer, the term of this patent is extended or adjusted under 35 U.S.C. 154(b) by 139 days.

(21) Appl. No.: 17/455,854

(22) Filed: Nov. 19, 2021

(65) Prior Publication Data

US 2022/0161637 A1 May 26, 2022

Related U.S. Application Data

(60) Provisional application No. 63/116,245, filed on Nov. 20, 2020.

(51) Int. Cl.
*B60J 1/00* (2006.01)
*B60J 1/02* (2006.01)
*E02F 9/16* (2006.01)
*E02F 3/32* (2006.01)

(52) U.S. Cl.
CPC .............. *B60J 1/006* (2013.01); *B60J 1/02* (2013.01); *E02F 9/163* (2013.01); *E02F 3/325* (2013.01)

(58) Field of Classification Search
CPC .... B60J 1/006; B60J 1/02; E02F 9/163; E02F 3/325
USPC .......................................................... 296/90
See application file for complete search history.

(56) References Cited

U.S. PATENT DOCUMENTS

| | | | | |
|---|---|---|---|---|
| 6,974,175 B2 * | 12/2005 | Willey | ..................... | B62J 17/04 280/288.4 |
| 8,684,442 B2 * | 4/2014 | Lehman | ................... | B62J 17/04 296/77.1 |
| 8,936,296 B1 * | 1/2015 | Fedders | ..................... | B60J 1/06 296/85 |
| 9,132,716 B1 * | 9/2015 | Mauro | ........................ | B60J 1/06 |
| 10,654,342 B2 * | 5/2020 | Andersson | ............... | B60J 1/007 |
| 2005/0236868 A1 * | 10/2005 | Beekman | ............... | B60J 1/1861 296/190.1 |
| 2012/0217371 A1 * | 8/2012 | Abdollahzadeh | .. | G08B 13/1463 248/551 |

FOREIGN PATENT DOCUMENTS

JP 2012102501 A * 5/2012 ............... B60J 1/00

* cited by examiner

*Primary Examiner* — Joseph D. Pape
*Assistant Examiner* — Dana D Ivey
(74) *Attorney, Agent, or Firm* — Stinson LLP

(57) ABSTRACT

A window assembly for attachment to a frame of a vehicle includes a window having a top, a bottom, sides, an outer surface, and an inner surface. A height of the window extends from the top to the bottom of the window. A width of the window extends between the sides of the window. A thickness of the window extends between the outer and inner surfaces. The window defines a plurality of slots. A clamp is securable to the frame of the vehicle for mounting the window assembly to the vehicle. A bolt is extendable through the clamp and window to couple the window to the clamp and frame. A fastener is engageable with the bolt to secure the window assembly to the frame.

9 Claims, 6 Drawing Sheets

ADJUSTABLE WINDOW

CROSS-REFERENCE TO RELATED APPLICATION

The present application claims the benefit of, and priority to, U.S. Provisional Application Ser. No. 62/116,245, which was filed Nov. 20, 2020, and which is incorporated herein by reference in its entirety for all purposes.

FIELD

The present invention generally relates to windows. In particular, the present invention relates to an adjustable window for a vehicle.

BACKGROUND

Plastic windows such as polycarbonate and acrylic windows may be desirable for use on certain vehicles because of their superior shatter resistance to traditional glass windows. Vehicles including UTVs, golf carts, excavators, and others may use plastic windows. Excavators, in particular, are a construction vehicle consisting of a boom, dipper, bucket and cab on a rotating platform (i.e., house). The cab is the area in which the operator sits to operate the excavator. Mini excavators are smaller excavators that incorporate reduced tail-swing or zero-tail-swing to provide tighter turns. In these and other types of excavators, the cab can be either closed or open. In a closed cab, windows/shields are permanently fixed to the frame of the cab to protect the operator from flying debris. In an open cab, the interior of the frame is exposed thus exposing the operator, at least partially, to the surrounding environment.

SUMMARY

In one aspect, a window assembly for attachment to a frame of a vehicle generally comprises a window having a top, a bottom, sides, an outer surface, and an inner surface. A height of the window extends from the top to the bottom of the window. A width of the window extends between the sides of the window. A thickness of the window extends between the outer and inner surfaces. The window defines a plurality of slots. A clamp is securable to the frame of the vehicle for mounting the window assembly to the vehicle. A bolt is extendable through the clamp and window to couple the window to the clamp and frame. A fastener is engageable with the bolt to secure the window assembly to the frame.

In another aspect, a window for use on a vehicle generally comprises a top, a bottom, sides, an outer surface, and an inner surface. A height of the window extends from the top to the bottom of the window. A width of the window extends between the sides of the window. A thickness of the window extends between the outer and inner surfaces. The window defines a plurality of slots.

BRIEF DESCRIPTION OF THE DRAWINGS

Corresponding reference characters indicate corresponding parts throughout the drawings.

DESCRIPTION OF THE PREFERRED EMBODIMENTS

Figure 1:
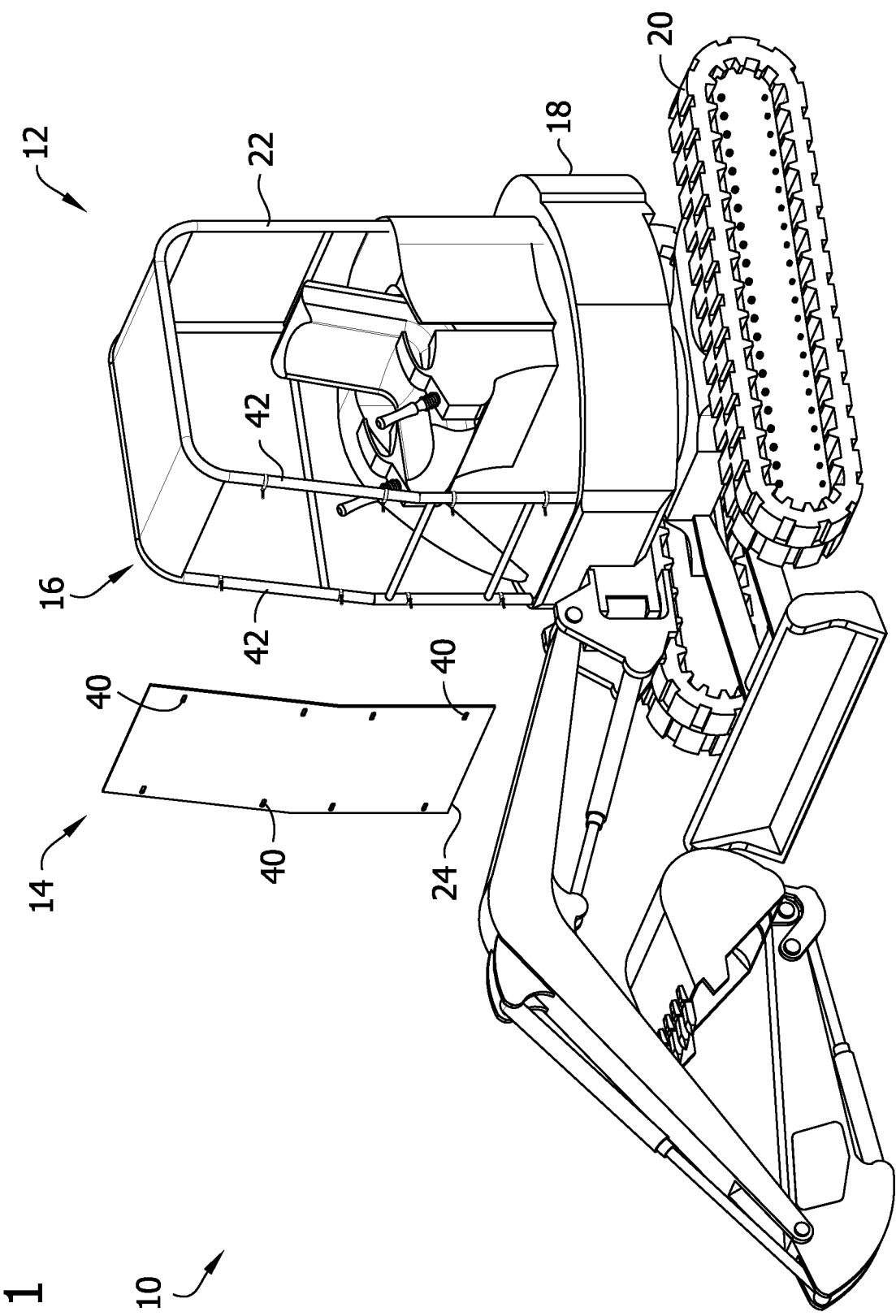
FIG. 1 is an exploded illustration of a vehicle assembly.
Figure 2:
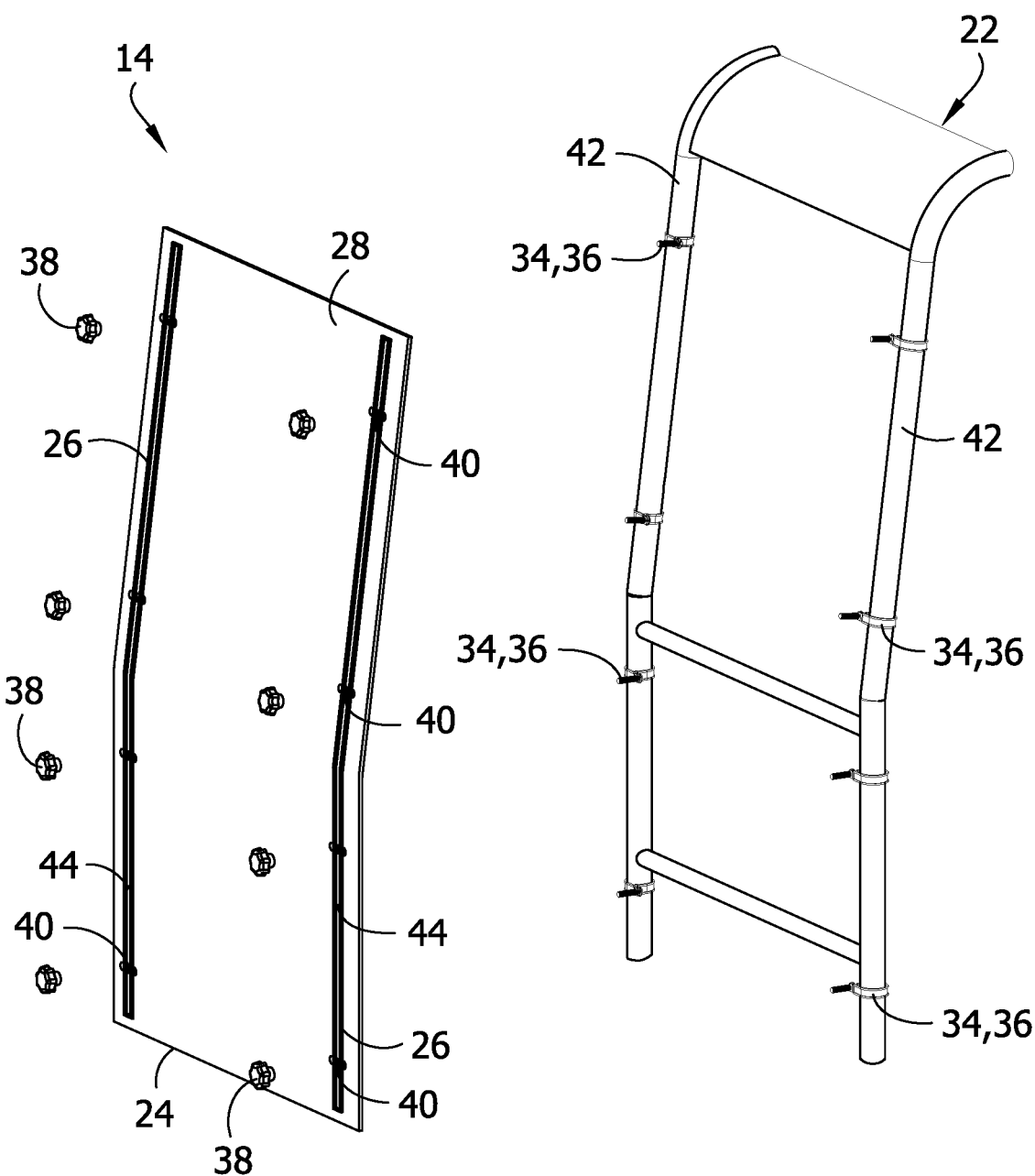
FIG. 2 is an exploded illustration of a roll cage and window assembly.

Referring now to the drawings, FIGS. 1 and 2 illustrate a vehicle assembly 10 including a vehicle 12 and a window assembly 14 selectively attachable to the vehicle. In the illustrated embodiment, the vehicle 12 is an open cab mini-excavator. Thus, the vehicle 12 includes a cab 16 mounted on a rotating platform 18. An undercarriage 20 supports the rotating platform 18 and includes tracks for transporting the vehicle. Since the cab 16 is an open cab, an interior of the cab is not enclosed by windows/screens permanently attached to a frame 22 of the cab. Rather, the removable window assembly 14 is attachable to the frame 22 of the cab 16 thus converting the open cab excavator into a closed, or at least partially closed, cab excavator. As a result, the open cab excavator 12 can be retrofit with a safety shield to provide protection to the operator siting in the cab 16. It will be understood that the window assembly 14 could be attached to frames of other vehicles without departing from the scope of the disclosure. For example, the window assembly 14 may be configured for use as a window/windshield for automotive vehicles (e.g., commercial vehicles and racing cars), power sports vehicles (e.g., motorcycles, all-terrain vehicles, utility vehicles, watercrafts, etc.), as well as industrial applications for construction and farming vehicles. To this effect, the window assembly 14 can provide a retro-fit safety shield to any suitable vehicle.

Referring to FIGS. 2-5, the window assembly 14 includes a window 24, outer clamping bars 26 securable to an outer surface 28 of the window, and inner clamping bars 30 securable to an inner surface 32 of the window. As will be explained in greater detail below, bolts 34 are configured to secure the window assembly 14 to an adel clamp 36 on the frame 22 (e.g., roll cage) of the cab 16. Thumb screws 38 (broadly, fasteners) secure the bolts 34 in place on the adel clamp 36 thereby securing the window assembly 14 to the frame 22. It will be understood that the window assembly 14, including the window 24, can be secured to the frame 22 in other ways without departing from the scope of the disclosure.

The window 24 is configured to provide the safety shield for the cab 16. In one embodiment, the window 24 has a plastic construction configuring the window to have shatter resistant properties. One suitable material for the window 24 is a polycarbonate and/or acrylic material. However, other plastic materials are envisioned without departing from the scope of the disclosure. Alternatively, the window 24 could be made from other suitable materials including glass. For example, the window 24 may be formed from standard commercial glass, Gorilla® Glass, chemically strengthened glass, or flexible glass. Also, additional coatings or layers can be added or applied to the window 24 without departing from the scope of the disclosure.

Referring to FIGS. 3A-5, the window 24 has a height H extending from a top to a bottom of the window, and a width W extending between longitudinal sides of the window. A thickness T of the window 24 extends between the outer surface 28 and the inner surface 32. The height H, width W, and thickness T can be sized to match the structure (e.g., frame 22) onto which the window 24 is attached. In the illustrated embodiment, the window 24 has a generally flat rectangular shape. However, the window 24 could have other shapes without departing from the scope of the disclosure. For example, the window 24 could be curved to match the contour of the frame 22 of the cab 16. Still other shapes and configurations are also envisioned. However, as described below, the flat window 24 is configured to adequately secure to a curved cab frame. In one embodiment, spacers (not shown) can be provided between the window 24 and the frame 22 to effectively flatten out the frame for mating with the generally flat shape of the window. Additionally, while the window 24 is shown as generally rectangular, the window 24 could have other shapes, such as any shape consistent with the shape of a window/windshield, without departing from the scope of the disclosure. Additionally, the window 24 could comprise a single layer of material or multiple layers of material suitably attached to each other.

A plurality of slots 40 are formed in the window 24. The slots 40 are arranged in two generally parallel rows extending along the height H of the window 24. Each row is disposed adjacent a respective longitudinal side of the window 24. The rows maybe be space apart such that a distance D (FIG. 5) between the longitudinal axis of each row generally matches the spacing between the left and right front frame members 42 of the frame 22. Thus, the distance D can be selected to match the structure on which the window 24 is being attached. Therefore, the slots 40 could be located at other positions and arranged on the window 24 in other ways without departing from the scope of the disclosure. Additionally, the number of slots 40 within a row and the spacing of the slots within a row may also vary.

Each slot 40 has major (i.e., longer) dimension extending generally along the width W of the window, and a minor (i.e., smaller) dimension extending generally along the height H of the window. In the illustrated embodiment, the major dimension extends generally parallel to the width W of the window 24, and the minor dimension extends generally parallel to the height H of the window. However, the slots 40 could be oriented in other directions without departing from the scope of the disclosure. For example, the slots 40 may extend vertically such that the major dimension extends along the height H of the window 24. The slots 40 are sized to pass a shaft of the bolts 34. Additionally, the major dimension of the slots 40 allows for bolts 34 to pass through the window 24 at the location of the frame members 42 even if the center of the slots its not directly aligned with the frame members 42. Thus, the slots 40 configure the window 24 for attachment to a variety of differently sized cabs 16. For example, cabs 16 having different heights and different widths.

Figure 3A:
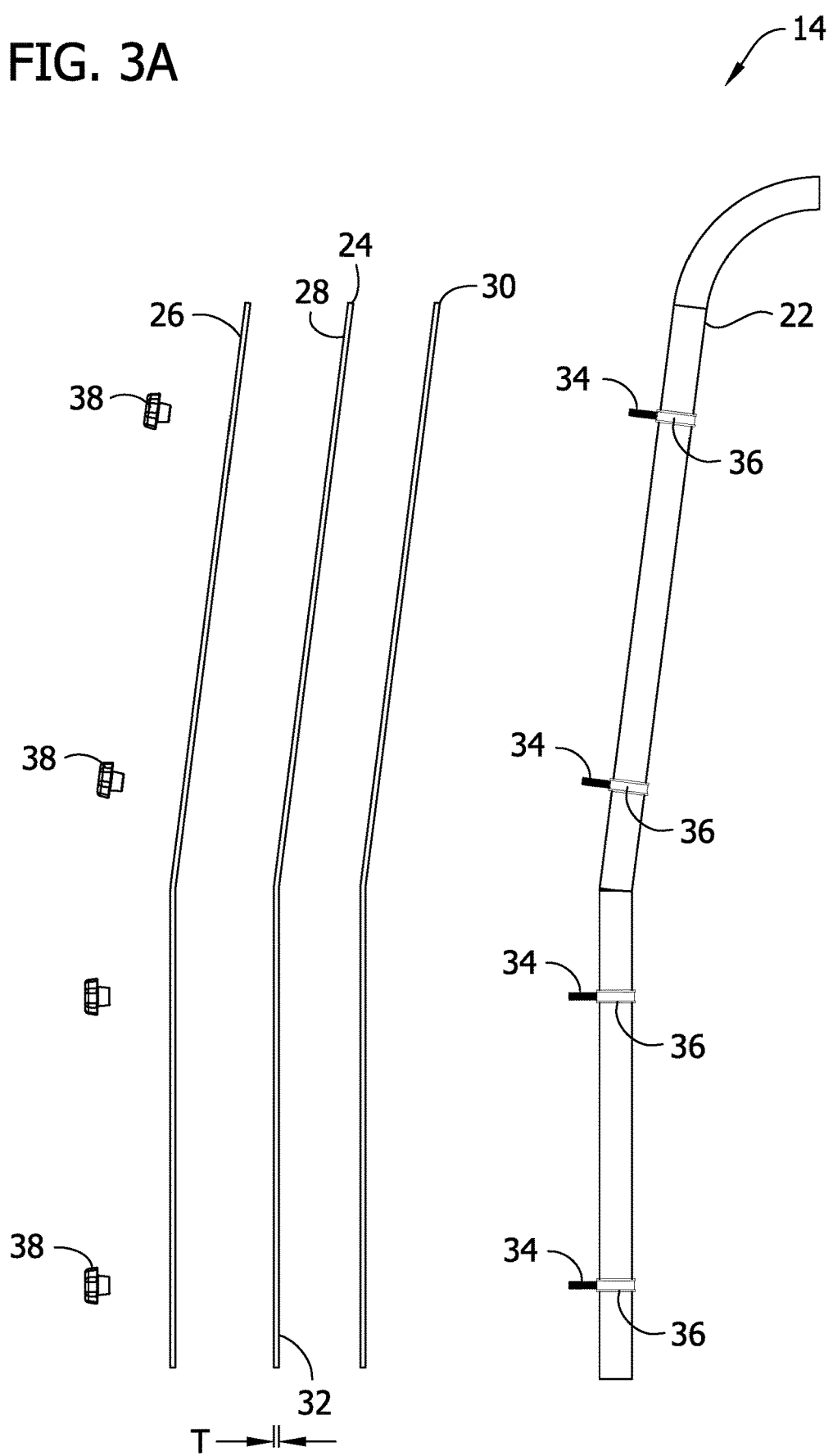
FIG. 3A is an exploded illustration of the window assembly.
Figure 3B:
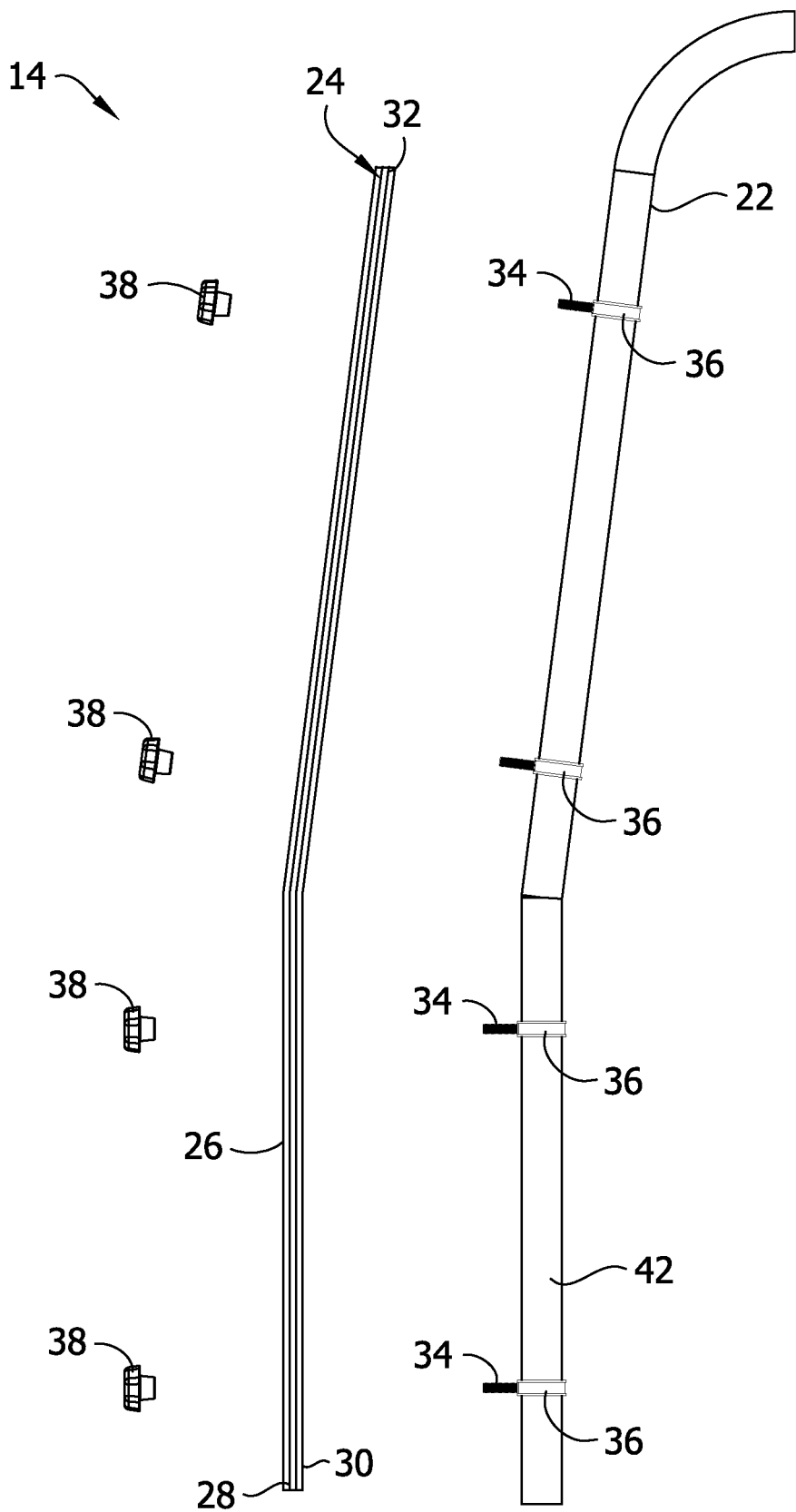
FIG. 3B is another exploded illustration of the window assembly.
Figure 4:
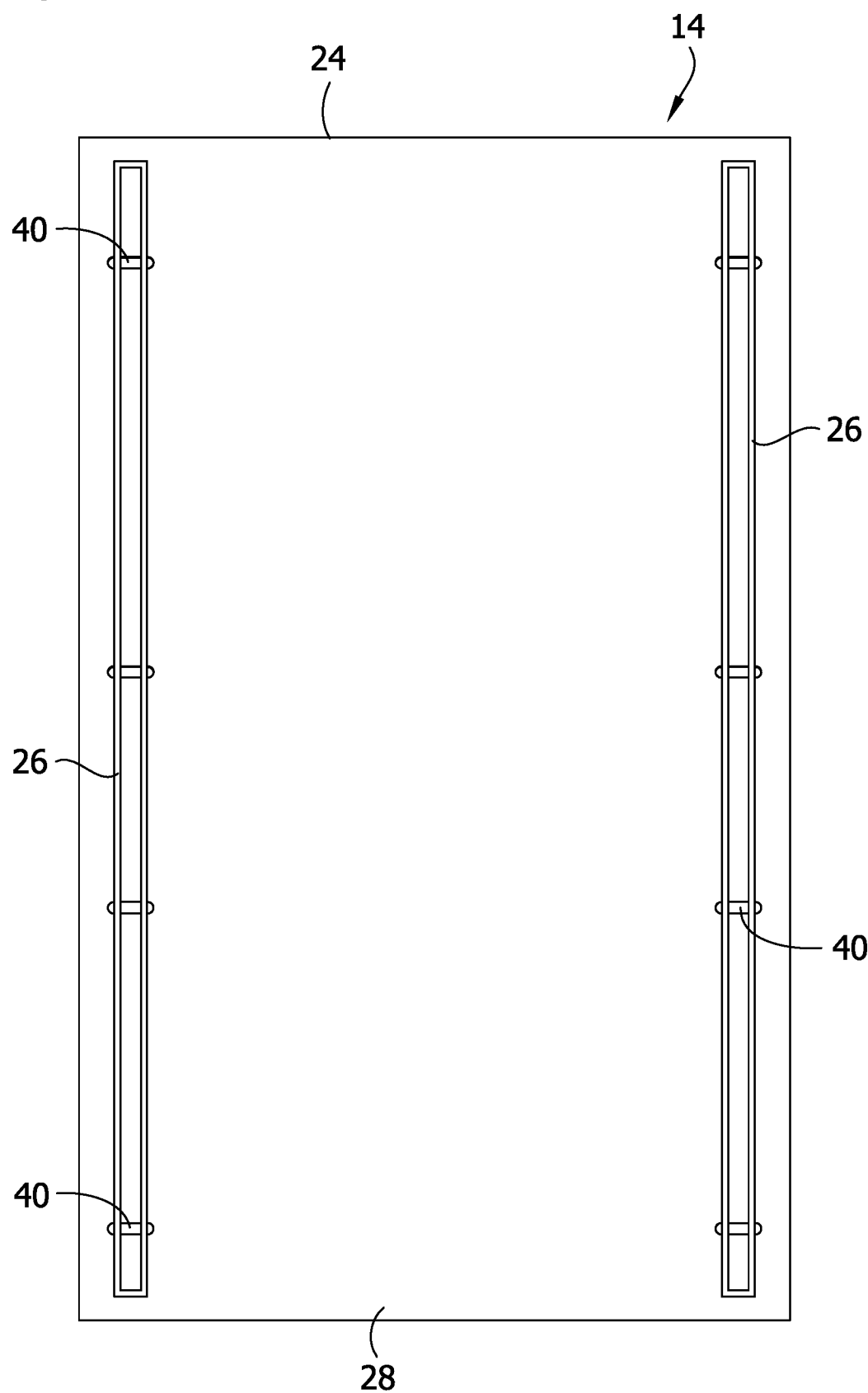
FIG. 4 is a front view of the window assembly.
Figure 5:
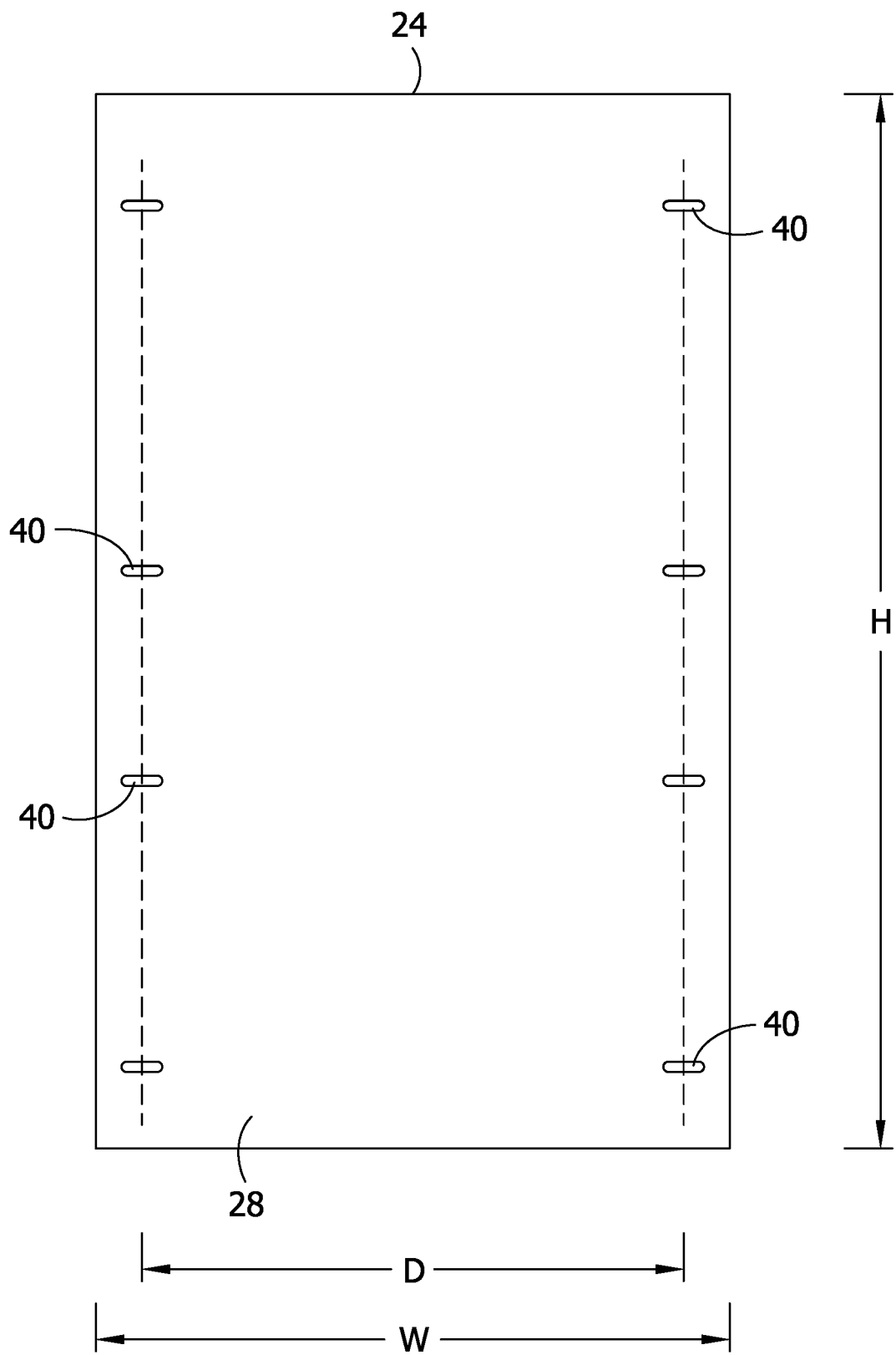
FIG. 5 is a front view of a window of the window assembly.

Referring to FIGS. 2-4, both the outer clamping bars 26 and the inner clamping bars 30 comprise elongate members defining at least one opening 44 (FIG. 2) extending along a length of the bar. The opening 44 is sized to pass a shaft of the bolts 34. The clamping bars 26, 30 can be fixedly attached to the window 24, or the bars can be separate from the window and secured to the window by virtue of the attachment of the window assembly 14 to the frame 22. The clamping bars 26, 30 provide structural reinforcement for the window 24 and provide connection locations for engagement with the adel clamps 36 and the thumb screws 38 for mounting the window to the frame 22. However, the clamping bars 26, 30 could be omitted without departing from the scope of the disclosure. In this embodiment, the adel clamps 36 and thumb screws 38 would directly engage the window 24 when the window is attached to the frame 22. The clamping bars 26, 30 may be formed from any suitable material. In one embodiment, the clamping bars are formed from metal.

To attach the window assembly 14 to the frame 22, the adel clamps 36 are secured around the frame members 42 of the frame at various locations along the length of the frame members. The bolts 34 are then extended through fastener holes (not shown) of the adel clamps 36 such that the shafts of the bolts extend away from the cab 16. The inner clamping bars 30 are then located over the bolts 34 such that the shafts of the bolts are received in the opening 44 in the inner clamping bars. The window 24 is then disposed over the inner clamping bars 30 whereby the shafts of the bolts 34 are received through respective slots 40 in the window to locate the window on the frame 22. The outer clamping bars 26 are then disposed over the outer surface 28 of the window 24 and located relative to the window by inserting the shafts of the bolts 34 in the opening 44 in the outer clamping bars. Finally, the thumb screws 38 are fastened around the ends of the bolts 34 to tighten and secure the window assembly 14 to the frame 22.

Additionally or alternatively, the window assembly 14 can be attached to the frame 22 of the cab 16 such that a hinge connection is made with one of the frame member 42 so that the window can be opened and closed. In this embodiment, the window assembly 14 may only be attached to one of the frame members 42 of the frame 22. Still other methods of forming a hinged connection between the window assembly 14 and frame 22 are envisioned without departing from the scope of the disclosure.

When introducing elements of aspects of the invention or the examples and embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several examples, embodiments, adaptations, variations, alternatives and uses of the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various examples and embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A window assembly for attachment to a frame of a vehicle, the window assembly comprising:
    a window having a top, a bottom, sides, an outer surface, and an inner surface, a height of the window extending from the top to the bottom of the window, a width of the window extending between the sides of the window, and a thickness of the window extending between the outer and inner surfaces, the window defining a plurality of slots;
    a first clamp secureable to the frame of the vehicle for mounting the window assembly to the vehicle;
    a first bolt extendable through the first clamp and window to couple the window to the first clamp and frame;
    a first fastener engageable with the first bolt to secure the window assembly to the frame, the first fastener being disengageable with the first bolt to allow the window to be removed from the frame while the clamp remains secured to the frame;
    a second clamp secureable to the frame of the vehicle for mounting the window assembly to the vehicle;
    a second bolt extendable through the second clamp and window to couple the window to the second clamp and frame;
    a second fastener engageable with the second bolt to secure the window assembly to the frame, the second fastener being disengageable with the second bolt to allow the window to be removed from the frame while the second clamp remains secured to the frame; and
    a first bar removably attachable to the inner surface of the window and a second bar removably attachable to the outer surface of the window, wherein the first and second bars define openings for receiving the first and second bolts to couple the bars to the frame.

2. The window assembly of claim 1, wherein the slots are arranged in rows extending along the height of the window.

3. The window assembly of claim 2, wherein the slots are arranged in two parallel rows.

4. The window assembly of claim 1, wherein each slot has major dimension extending generally along the width of the window, and a minor dimension extending generally along the height of the window, the major dimension being greater than the minor dimension.

5. The window assembly of claim 4, wherein the major dimension extends parallel to the width of the window, and the minor dimension extends parallel to the height of the window.

6. The window assembly of claim 1, wherein the clamp is an adel clamp.

7. The window assembly of claim 1, in combination with a vehicle.

8. The window assembly of claim 7, wherein the vehicle is an excavator.

9. The window assembly of claim 1, wherein the clamp is securable directly to the frame of the vehicle such that the clamp contacts the frame.

* * * * *